UNITED STATES PATENT OFFICE.

GEORGE BOURK WILLIAMSON, OF GRAMERCY, LOUISIANA, ASSIGNOR OF ONE-THIRD TO BLANCHE AUGRAIN, OF NEW ORLEANS, LOUISIANA.

PREPARATION FOR CLARIFYING CANE-JUICES.

No. 797,391. Specification of Letters Patent. Patented Aug. 15, 1905.

Application filed November 30, 1904. Serial No. 234,958.

*To all whom it may concern:*

Be it known that I, GEORGE BOURK WILLIAMSON, a citizen of the United States, and a resident of Gramercy, in the parish of St. James and State of Louisiana, have invented certain new and useful Improvements in Preparations for Clarifying Cane Juices and Syrups and Methods of Using the Same, of which the following is a full, clear, and exact description.

My invention relates to a preparation for clarifying cane juices and syrups and to a method of using said preparation.

I have made the discovery that the so-called "bone-black dust," a waste product of sugar-refineries, if admixed with sulfuric acid and water in suitable proportions undergoes a chemical change and forms a paste having rare qualities which are useful in the clarifying of juices and syrups produced during the making of sugar and molasses.

The bone-black dust above referred to is a refuse from sugar-refineries and is of no value. I admix bone-black dust, sulfuric acid, and water in the proportions of about three-quarters of a pound of the acid to one pound of the bone-black dust and one pound of water. The ingredients form a paste having the consistency of ordinary mortar. The above-mentioned proportions are only approximate, for the reason that the impurities of the acid and of the bone-black dust determine to some extent the quantity which should be employed. The acid and the bone-black dust form a bone-phosphate, which is therefore a prominent ingredient of the paste. In treating the juices to be clarified I add thereto a small proportion of the paste above described, the proportion being preferably about one pound of the paste to four thousand pounds of the juice. The admixture is now boiled a short time, with the result that a large number of the impurities contained in the juice are precipitated by the paste and settle very rapidly, leaving a clear juice comparatively free from impurities and also free from the paste. The juices are next evaporated, so as to convert them into syrups preparatory to another evaporation for converting them into sugar. By adding a little water to a small quantity of the paste and filtering the admixture, preferably through sand, I obtain a liquid. A portion of this liquid is used in the syrups from the evaporators, these syrups being treated in the same manner as the juices, and are then flowed into the vacuum-pans to be boiled in order to produce sugar.

In brief, I treat the raw juices with paste, then evaporate them to syrups, next treat them with a liquid made from the paste, and finally reduce them to sugar.

The paste is likewise used in syrups before filtration through ordinary bone-black, the impurities which are precipitated being removed by mechanical filtration.

The use of the preparation above described does not injure the sugar or syrup, and it greatly increases the percentage of the output. It does away with the necessity for using sulfur, which is a very expensive article and which has been used in practically all cane-sugar factories. The residuum known as "filter-press cakes," which is in one sense a waste product of the sugar-factory, is increased in value for use as a fertilizer by the employement of the paste above referred to. The filter-press cakes receive phosphoric acid from the paste, this phosphoric acid being a necessary and valuable ingredient for fertilizers. These filter-press cakes are used almost exclusively for fertilizers.

Having thus described my invention, I claim as new and desire to secure by Letters Patent—

A preparation for clarifying cane juices and syrups, containing bone-black dust, sulfuric acid and water in the proportion of one pound of bone-black dust, one pound of water and three-quarters of a pound of sulfuric acid.

In testimony whereof I have signed my name to this specification in the presence of two subscribing witnesses.

GEORGE BOURK WILLIAMSON.

Witnesses:
FERNAND ALEXANDER,
P. CHAS. SIMON.